(12) United States Patent
Pauley et al.

(10) Patent No.: US 10,599,353 B2
(45) Date of Patent: Mar. 24, 2020

(54) TECHNIQUES FOR MANAGING STORAGE SPACE ALLOCATION WITHIN A STORAGE DEVICE

(71) Applicant: Apple Inc., Cupertino, CA (US)

(72) Inventors: Mark A. Pauley, San Jose, CA (US); Cameron S. Birse, San Jose, CA (US); Kazuhisa Yanagihara, Cupertino, CA (US); Susan M. Grady, Campbell, CA (US); Timothy P. Hannon, Mountain View, CA (US)

(73) Assignee: Apple Inc., Cupertino, CA (US)

(*) Notice: Subject to any disclaimer, the term of this patent is extended or adjusted under 35 U.S.C. 154(b) by 233 days.

(21) Appl. No.: 15/725,175

(22) Filed: Oct. 4, 2017

(65) Prior Publication Data

US 2018/0335968 A1    Nov. 22, 2018

Related U.S. Application Data

(60) Provisional application No. 62/507,180, filed on May 16, 2017.

(51) Int. Cl.
*G06F 3/06* (2006.01)
*G06F 12/0891* (2016.01)
(Continued)

(52) U.S. Cl.
CPC .......... *G06F 3/0631* (2013.01); *G06F 3/0604* (2013.01); *G06F 3/068* (2013.01);
(Continued)

(58) Field of Classification Search
CPC .... G06F 3/0631; G06F 3/0604; G06F 3/0652; G06F 3/068; G06F 12/0891;
(Continued)

(56) References Cited

U.S. PATENT DOCUMENTS

| | | | |
|---|---|---|---|
| 7,827,358 B2 * | 11/2010 | Watson | G06F 9/485 |
| | | | 711/135 |
| 9,569,260 B2 | 2/2017 | Kishan et al. | |

(Continued)

FOREIGN PATENT DOCUMENTS

WO    2015171028 A1    11/2015

*Primary Examiner* — Ramon A. Mercado
(74) *Attorney, Agent, or Firm* — Dickinson Wright RLLP

(57) ABSTRACT

This application sets forth techniques for managing the allocation of storage space within a storage device that is communicably coupled to a computing device. Requests are received from a plurality of applications executing on the computing device, in which each request specifies a respective amount of storage space to be reserved within the storage device. Detection is performed for the availability of a minimum amount of free space that corresponds to an optimal amount of space for executing at least one application of the plurality of applications. A respective priority ranking for each application is identified based on historical data gathered for the applications. Based on the priority rankings, a subset of requests from the plurality of requests is established. For each request of the subset, at least a portion of the respective amount of space specified by the request is reserved while maintaining the minimum amount of free space.

20 Claims, 11 Drawing Sheets

(51) Int. Cl.
*G06F 12/126* (2016.01)
*G06F 11/34* (2006.01)
*G06F 12/02* (2006.01)
*G06F 12/0873* (2016.01)

(52) U.S. Cl.
CPC .......... *G06F 3/0611* (2013.01); *G06F 3/0625* (2013.01); *G06F 3/0652* (2013.01); *G06F 3/0679* (2013.01); *G06F 11/34* (2013.01); *G06F 12/0238* (2013.01); *G06F 12/0891* (2013.01); *G06F 12/126* (2013.01); *G06F 12/0873* (2013.01); *G06F 2212/1024* (2013.01); *G06F 2212/1028* (2013.01); *G06F 2212/1044* (2013.01); *G06F 2212/205* (2013.01); *G06F 2212/222* (2013.01); *G06F 2212/604* (2013.01); *G06F 2212/7202* (2013.01); *G06F 2212/7205* (2013.01)

(58) Field of Classification Search
CPC ....... G06F 2212/1044; G06F 2212/205; G06F 2212/604
See application file for complete search history.

(56) References Cited

U.S. PATENT DOCUMENTS

| | | | |
|---|---|---|---|
| 2010/0107172 A1 | 4/2010 | Calinescu et al. | |
| 2012/0324198 A1* | 12/2012 | Spradlin | G06F 12/0223 711/170 |
| 2014/0304485 A1 | 10/2014 | Joshi | |

\* cited by examiner

Cache Data Deletion Procedures 326

| DATA STRUCTURE 328 | | | |
|---|---|---|---|
| ASSIGNED APPLICATION PRIORITY RANK | APPLICATION ID | FILE ID | CACHE DATA DELETION STATUS |
| 2 | APPLICATION 202 | FILE 330-1 | DELETED |
| 2 | APPLICATION 202 | FILE 330-2 | PENDING |
| 2 | APPLICATION 202 | FILE 330-3 | DELETED |
| 3 | APPLICATION 204 | FILE 332-1 | DELETED |
| 3 | APPLICATION 204 | FILE 332-2 | PENDING |
| 3 | APPLICATION 204 | FILE 332-3 | DELETED |
| ••• | ••• | ••• | ••• |

TECHNIQUES FOR MANAGING STORAGE SPACE ALLOCATION WITHIN A STORAGE DEVICE

CROSS-REFERENCE TO RELATED APPLICATIONS

The present application claims the benefit of U.S. Provisional Application No. 62/507,180, entitled "TECHNIQUES FOR MANAGING STORAGE SPACE ALLOCATION WITHIN A STORAGE DEVICE," filed May 16, 2017, the content of which is incorporated herein by reference in its entirety for all purposes.

FIELD OF INVENTION

The described embodiments relate generally to memory allocation procedures for storage devices. More particularly, the present embodiments relate to techniques that involve allocating memory for specific applications in accordance with fluctuating memory storage space conditions on a computing device.

BACKGROUND

A modern storage device—e.g., a high-capacity solid state drive (SSD)—included in a computing device can enable a variety of applications to be installed on the computing device and store considerable amounts of data. In some cases, a given application can require a specific amount of memory storage space within the storage device to be available in order to effectively carry out various operations, e.g., downloading data from a remote server. In some cases, it can be desirable for the downloaded data to be retained within the storage device as cache data if the cache data is frequently accessed by the application. In particular, cache data can provide a more enjoyable user experience as the cache data reduces the latency/resources that are otherwise involved in re-downloading the data in a reactive manner, e.g., in response to a user seeking to access the data at a later time.

Notably, as the memory storage space within the storage device is consumed by greater amounts of cache data, the computing device may become incapable of operating in an optimal manner. For instance, problems can arise when a given application attempts to perform a data download operation and not enough memory storage space is available within the storage device. To remedy this situation, the computing device can perform cache data deletion procedures that attempt to free up memory storage space within the storage device so that the data download operation can proceed. However, as memory storage space is freed from cache data deletion procedures, a thrashing scenario can take place in which multiple applications compete to consume the freed-up storage space. Consequently, additional cache data deletion procedures may be required, which can further perpetuate the thrashing scenario.

SUMMARY

Accordingly, representative embodiments set forth herein disclose techniques that involve allocating memory for applications in accordance with fluctuating memory storage space conditions at a computing device.

One embodiment sets forth a method for managing the allocation of storage space within a storage device included in a computing device. In particular, the method can be implemented by the computing device, and involves a first step of receiving a plurality of requests from a plurality of applications executing at the computing device, in which each request specifies a respective amount of space to be reserved within the storage device. Next, the method involves detecting whether a minimum amount of free space is available within the storage device, in which the minimum amount of free space corresponds to an optimal amount of space for executing at least one application of the plurality of applications. Additionally, the method involves identifying, based on historical data gathered for the plurality of applications, a respective priority ranking for each application of the plurality of applications. Subsequently, the method involves, based on the respective priority ranking for each application of the plurality of applications, establishing a subset of requests from the plurality of requests. Finally, the method involves the step of, for each request of the subset of requests: reserving at least a portion of the respective amount of space specified by the request while maintaining the minimum amount of free space.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
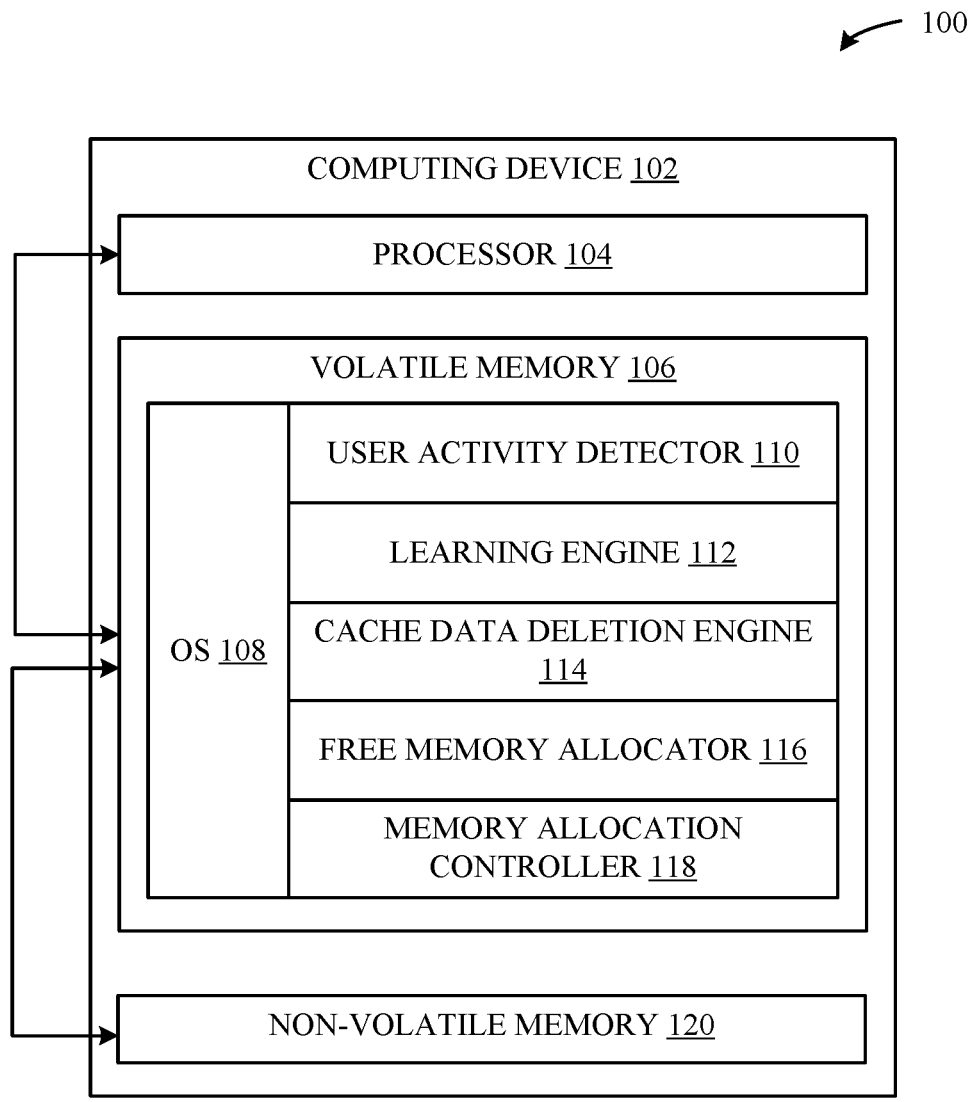
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

As previously described above, the occurrence of thrashing conditions within a storage device can result in a computing device wasting power resources and sacrificing network bandwidth. Additionally, thrashing conditions can also result in increased storage device wear which correspondingly leads to a shorter lifetime for the storage device. Indeed, situations can arise in which multiple applications compete with one another to consume free storage space within the storage device, which causes low-storage space conditions to arise. In turn, the computing device can issue requests to the applications to eliminate at least a portion of their data to free-up additional storage space within the storage device. However, as the storage space is freed, the applications (and/or other entities operating on the computing device) can fall back into executing operations that consume the free storage space, thereby establishing a thrashing condition. To address this scenario, some embodiments set forth a technique for orchestrating the manner in which applications both consume and free up storage space within a storage device of a computing device. According to some embodiments, the technique can involve initially receiving a number of requests to perform an operation, such as a data download operation, from a number of different applications that are executing on the computing device. Each of these requests can specify a specific amount of memory storage space to be reserved within the storage device based on the operation to be performed. In response, the technique can involve detecting whether a minimum amount of free memory storage space is available within the storage device. In particular, the minimum amount of free memory storage space can correspond to an amount of memory storage space that allows at least one application from the number of different applications to execute in a more optimal manner. For example, this can enable the at least one application to cache information that is regularly-accessed by the at least one application. In this manner, the cached information can eliminate the need for the at least one application to download the information each time it is accessed, thereby enhancing energy efficiency and increasing the overall responsiveness of the at least one application.

The technique can also involve identifying a respective priority ranking for each application from the number of different applications. According to some embodiments, the respective priority ranking for each application can be based on historical user activity data (e.g., frequency of use, last launch date, etc.) gathered for each respective application. Additionally, the priority rankings can be involved on non-historical information, e.g., the amount of cache data presently managed by the plurality of applications, or any other criteria associated with the application. In turn, a subset of requests from the number of requests can be established based on the respective priority ranking for each application. Furthermore, the technique also includes, for each request of the subset of requests, reserving at least a portion of the respective amount of space specified by the request while maintaining the minimum amount of free memory storage space.

A more detailed description of the various techniques described herein, and the manner in which they can be implemented, is provided below in conjunction with FIGS. 1, 2A-2B, 3A-3D, 4A-4C and 5.

Figure 5:
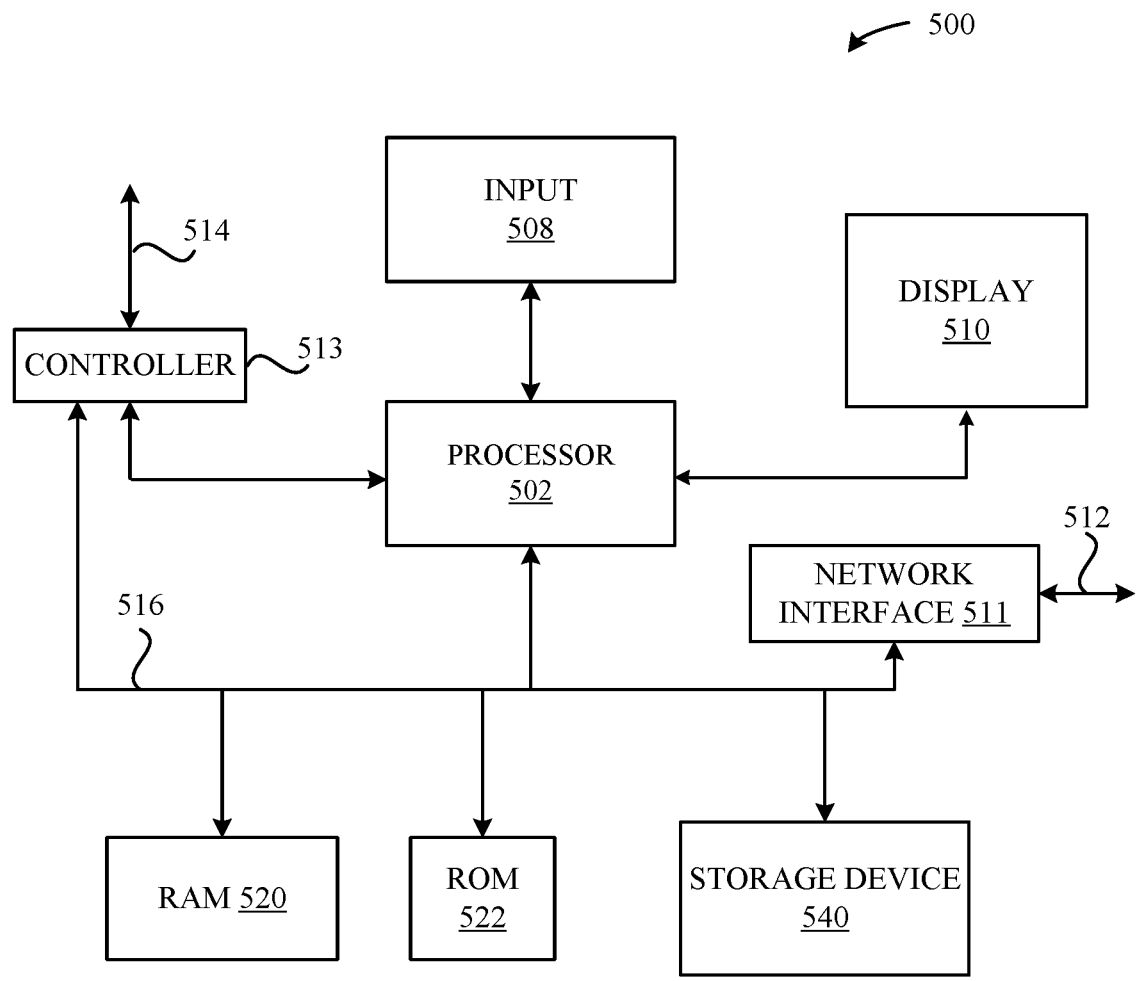
FIG. 5 illustrates a detailed view of a computing device that can be used to implement the various techniques described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 120 (e.g., a storage device). It is noted that a more detailed breakdown of example hardware components that can be included in the computing device 102 is illustrated in FIG. 5, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) 108 can be loaded into the volatile memory 106, where the OS 108 can use or request execution of software that collectively enable the various techniques described herein to be implemented. As described in greater detail herein, such applications can include a user activity detector 110, a learning engine 112, a cache data deletion engine 114, a free memory allocator 116, and a memory allocation controller 118, and the like.

It should be noted that, although the procedures described herein are performed to free up storage space within the non-volatile memory 120, the described embodiments are not limited as such. For instance, according to some embodiments, the described procedures can be performed to free up storage space within the volatile memory 106 and/or other data storage devices coupled to the computing device 102. Additionally, it should be appreciated that the various procedures described herein can be generally performed at a file-system level. For instance, as will be described in greater detailed herein, the deletion of cache data can be initiated based on requests for one or more applications to delete files associated with the cache data. In this fashion, according to some embodiments, the described procedures can be performed on file systems that include, but are not limited to, local file systems, cloud-based file systems, and so on.

According to some embodiments, the user activity detector 110 can enable the computing device 102 to detect different levels of user activity associated with different applications that execute on the computing device 102. For example, the user activity detector 110 can record detected levels of user activity as historical user activity data for each of the different applications over a pre-determined period of time (e.g., hours, days, months, years, etc.). According to some embodiments, the historical user activity data can include the number of instances in which a user initiates a request for a particular application to perform a functionality that is tied to a data download operation. The data download operation can include, for example, downloading video files (e.g., movies, television show episodes, etc.), audio files (e.g., song files, audio book files, etc.), documents (e.g., word processing documents, presentation documents, spreadsheets, texts, messages, etc.), applications (e.g., video games, utilities, etc.), and so on.

In this manner, the user activity detector 110 can detect different types of requests issued by one or more applications that correspond to (1) a particular action the user desires the respective application to perform, and (2) the number of times they are issued. For instance, the user activity detector 110 can detect, for a given application, the number of times data download requests were issued. In some embodiments, a data download request can specify an amount of memory storage space that is required (e.g., within the non-volatile memory 120) to download a particular file in a satisfactory manner. In turn, and as described in greater detail herein, the historical user activity data generated by the user activity detector 110 can be analyzed by the learning engine 112 to establish meaningful observations about user behaviors.

According to some embodiments, the learning engine 112 can be configured to identify user activity patterns associated with one or more applications based on the historical user activity data described herein. According to some embodiments, the learning engine 112 can be triggered to analyze new user activity patterns when particular threshold time periods are satisfied (e.g., hours, days, months, years, etc.). According to some embodiments, the learning engine 112 can determine, based on user activity patterns collected for a specified threshold time period, that specific applications are utilized with greater frequencies relative to other applications. In turn, the learning engine 112 can produce user preference data based on the user activity patterns. As described in greater detail herein, the user preference data generated by the learning engine 112 can be used to establish application priority rankings. In particular, these application priority rankings can be used to prioritize requests issued by applications in preparation for the procedures performed by the cache data deletion engine 114 and/or the free memory allocator 116.

According to some embodiments, the cache data deletion engine 114 can include the functionality to perform procedures that result in the deletion of cache data produced by different applications executed by the computing device 102 over time. According to some embodiments, the cache data deletion engine 114 can be configured to invoke a service, available to the cache data deletion engine 114, to perform the various cache data deletion procedures described herein. For example, through the use of one or more application program interface ("API") calls, the cache data deletion engine 114 can invoke a service or process, executable on the computing device 102, that performs procedures that can ultimately lead to the deletion of cache data associated with one or more files under the domain of a particular application.

According to some embodiments, the cache data deletion engine 114 can be configured to issue a request for a particular application to delete one or more files at a file system level. For example, the cache data deletion engine 114 can generate a request for an application to identify and delete one or more files for purposes of creating memory storage space. It should be noted that, in some scenarios, the cache data deletion engine 114 can be configured to identify one or more applications that frequently comply with a request, issued by the cache data deletion engine 114, to delete one or more files. In this fashion, the cache data deletion engine 114 can repeatedly communicate requests to these compliant applications to delete their respective files over those applications that comply less frequently. By targeting the more compliant applications in this manner, the cache data deletion engine 114 can help the computing device 102 quickly obtain the desired freed up memory storage space. Accordingly, using the cache data deletion procedures described herein, the cache data deletion engine 114 can help free up memory storage space within the non-volatile memory 120 so that additional operations can be performed for an application that is requesting use of the memory storage space.

According to some embodiments, the free memory allocator 116 can include the functionality to reserve memory storage space (within the non-volatile memory 120) that is freed upon the completion of cache data deletion procedures initiated by the cache data deletion engine 114. According to some embodiments, the free memory allocator 116 can reserve a specified amount of memory storage space within the non-volatile memory 120 to execute an operation for one or more applications. For example, the free memory allocator 116 can reserve memory storage space that has been made available to perform a data download operation. Upon completion of the data download operation, the free memory allocator 116 can wait for a new request to reserve additional memory storage space as cache data deletion procedures are performed.

According to some embodiments, the memory allocation controller 118 can be a primary component within the computing device 102 that processes requested operations issued by applications on computing device 102. According to some embodiments, the memory allocation controller 118 can issue control signals to various different components resident on the computing device 102, including the cache data deletion engine 114 and the free memory allocator 116. The memory allocation controller 118 can also issue control signals to other components, e.g., the user activity detector 110 and/or the learning engine 112. According to some embodiments, and as described in greater detail herein, the memory allocation controller 118 can utilize the user preference data (provided by the learning engine 112) to assign application priority rankings to different applications executed by the computing device 102.

In one example, the memory allocation controller 118 can assign, based on the user preference data, higher priority rankings to the applications that are frequently used, and assign lower application priority rankings to the applications that are not frequently used. Based on the priority rankings, the memory allocation controller 118 can prioritize requests issued by applications (e.g., data download requests) in preparation for further procedures to be performed by the cache data deletion engine 114 and/or the free memory allocator 116, which is described below in greater detail. Notably, and according to some embodiments, different components—such as the learning engine 112 and/or the user activity detector 110—can be configured to recommend application priority ranks to the memory allocation controller 118, which, in turn, can influence the manner in which application priority ranks are ultimately determined. In this fashion, the described embodiments can be configured to allow different components—not just the memory allocation controller 118—to influence the manner in which application priority rankings are determined.

According to some embodiments, the priority levels attributed to cache data can be determined by each application, and can vary between different applications in accordance with a respective cache data priority policy implemented by a particular application. As will be discussed in greater detail herein, the memory allocation controller 118 can send control signals, to the cache data deletion engine 114, that result in the deletion of cache data in a manner that allows each application to decide which cache data ultimately gets deleted. For instance, according to some embodiments, the memory allocation controller 118 initiates procedures by either (1) invoking a service that performs the deletion procedures or (2) requesting one or more applications to delete files themselves.

It should be noted that the described embodiments can be configured to enable the cache data deletion engine 114 to issue requests for applications to delete one or more files without waiting for each request to be fulfilled by each respective application. For instance, if the cache data deletion engine 114 issues a request for a first application to delete one or more files, the cache data deletion engine 114 can issue a different request to a different application, without waiting for the first application to finish the performance of cache data deletion procedures. In this fashion, the computing device 102 can obtain a desired amount of memory storage much more quickly and efficiently.

According to some embodiments, knowledge of the priority levels associated with the different cache data for a particular application can influence the manner in which instructions are issued, by the memory allocation controller 118, to the cache data deletion engine 114. For instance, in one scenario, if a first application has a larger number of low priority cache data than a second application, the memory allocation controller 118 can instruct the cache data deletion engine 114 to engage the first application in a file deletion request before the second application. In turn, the cache data associated with the first application can be deleted before the cache data associated with the second application in a manner that enables a desired amount of memory storage to be obtained much more quickly and efficiently.

According to some embodiments, the memory allocation controller 118 can send control signals to cache data deletion engine 114 to initiate procedures that result in the deletion of all, or at least a portion thereof, cache data that is considered to be of a particularly priority (e.g., a "low" priority) to the application. In this fashion, the memory allocation controller 118 can send multiple control signals to the cache data deletion engine 114 that result in the deletion of cache data that is assigned to a particular priority level belonging to a number of different applications. In this manner, additional memory storage space can be freed in a shorter period of time. In some cases, the memory allocation controller 118 can determine that the available memory storage space is not sufficient despite deleting all cache data considered to be low priority. In response to this condition, the memory allocation controller 118 can send control signals to the cache data deletion engine 114 that result in the deletion of higher priority cache data for one or more of the applications.

Upon completion of the cache data deletion procedures, the memory allocation controller 118 can instruct the free memory allocator 116 to reserve the memory storage space that is freed as a result of the cache data deletion procedures for applications specified by the memory allocation controller 118. For instance, the memory allocation controller 118 can instruct the free memory allocator 116 to reserve the newly-freed memory storage space for a high-priority application that is requesting to perform a data download operation. In this manner, the memory allocation controller 118 can orchestrate the procedures performed by the free memory allocator 116 to prevent different applications from competing for (and consuming) the memory storage spaced that is freed by procedures initiated by the cache data deletion engine 114.

According to some embodiments, components of the computing device 102 can be configured to perform the various procedures described herein as background tasks to minimize their interference with front-facing applications (e.g., native applications, third-party applications, etc.). Moreover, the various procedures described herein can exhibit deference to user-initiated requests for applications to perform operations. More specifically, the memory allocation controller 118 can instruct the free memory allocator 116 to reserve newly-freed memory storage space for a user-initiated request to perform a data download operation for a specific application. For example, it can be possible for an application having a lower priority to access newly-freed memory storage space even in situations where a higher priority application has reserved or is attempting to reserve the newly-freed memory storage space. In this manner, the requested operations issued by applications can be considered to be speculative in nature as bias will be shown toward any newly-detected, user-initiated requests.

Accordingly, FIG. 1 provides a high-level overview of different hardware/software architectures that can be implemented by computing device 102 to effectively carry out the various techniques described herein. A more detailed breakdown of these techniques will now be provided below in conjunction with FIGS. 2A-2B, 3A-3D, 4A-4C and 5.

Figure 2A:
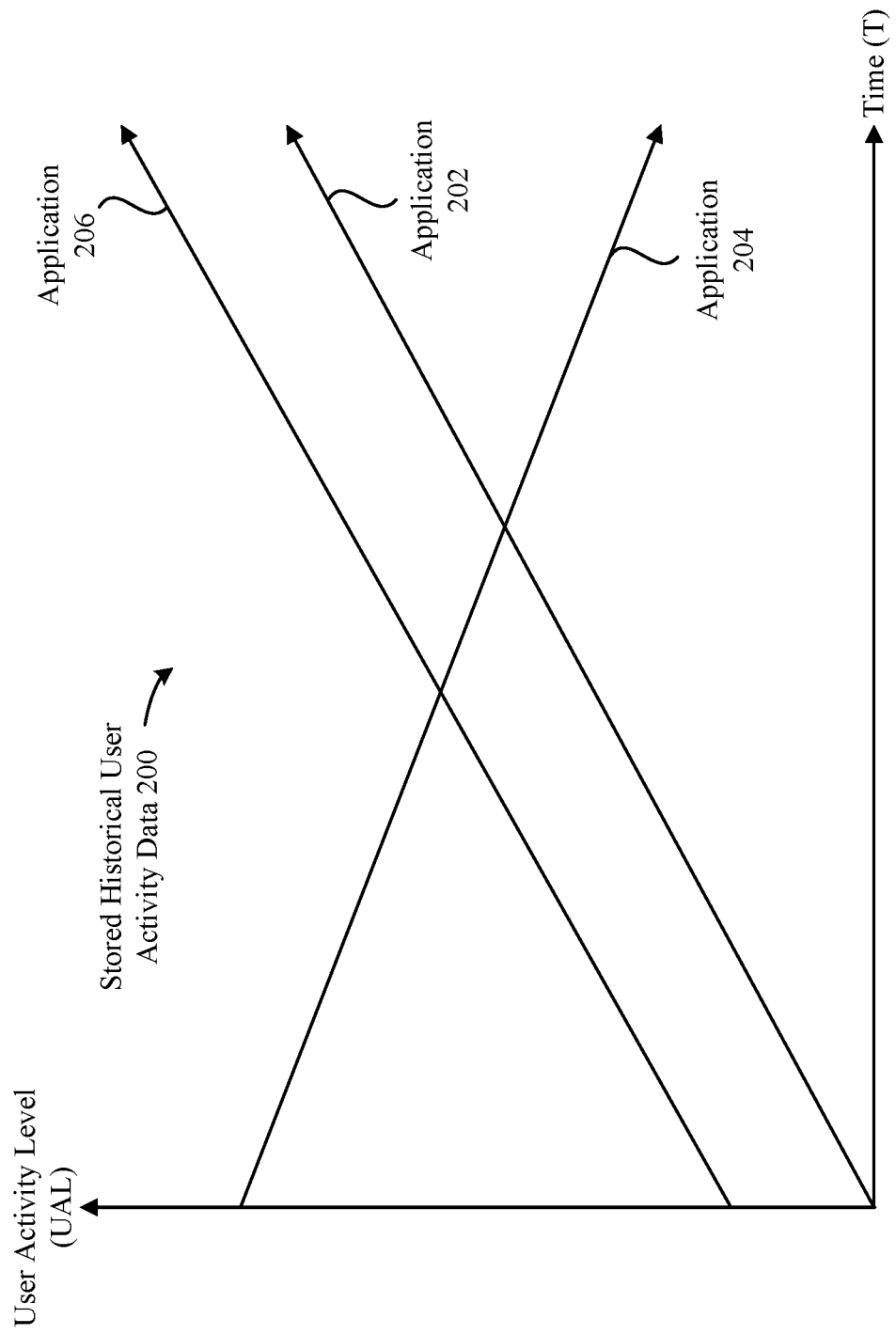
FIGS. 2A-2B depict examples of data that can be used to manage the allocation of storage space within a storage device, according to some embodiments.
Figure 2B:
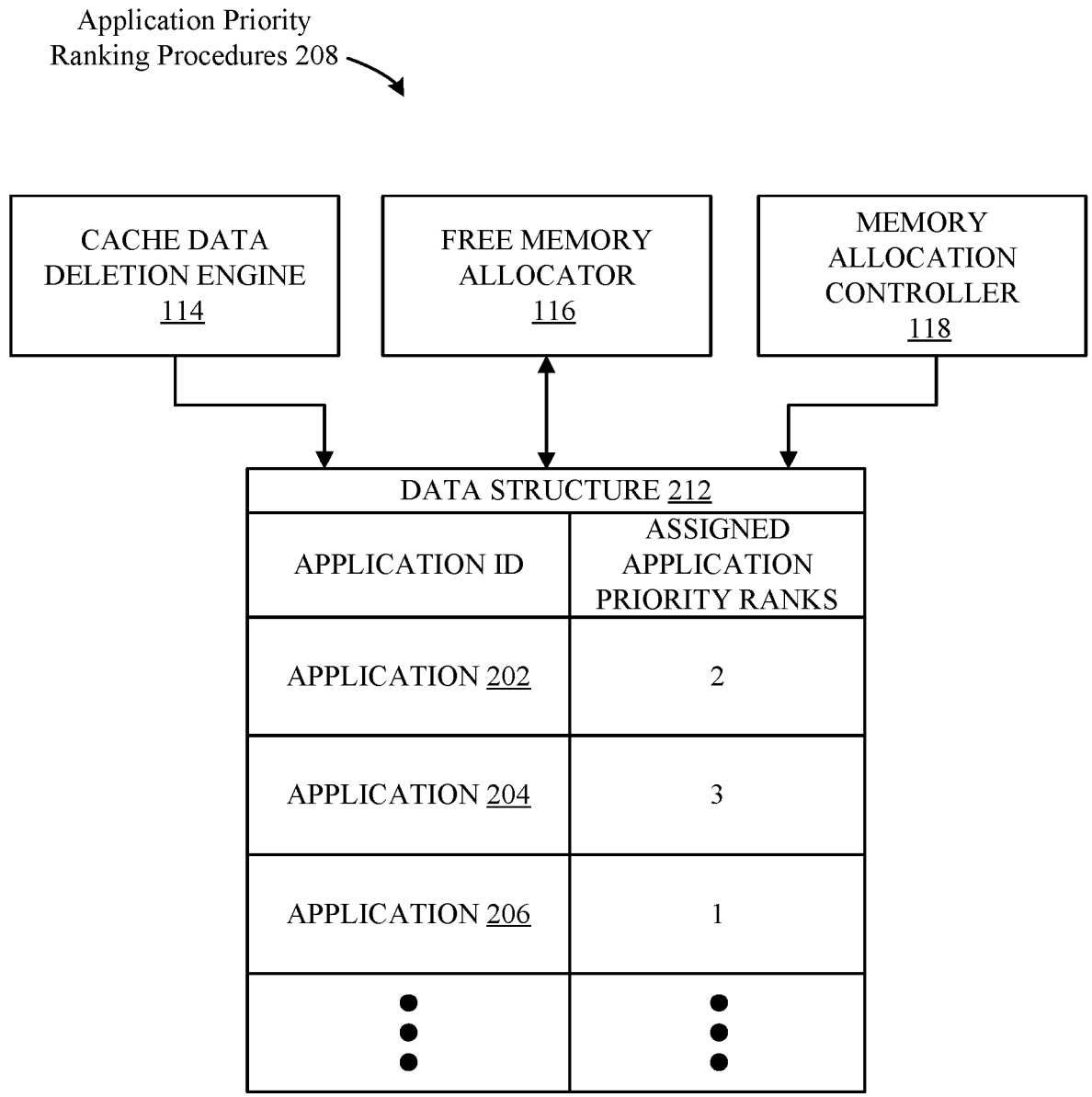

FIGS. 2A-2B depict examples of data that can be used to minimize fluctuating memory storage space conditions within the non-volatile memory 120, according to some embodiments. In particular, FIG. 2A depicts a graphical illustration of historical user activity data (stored historical user activity data 200) that can be gathered and analyzed by components of the computing device 102. For example, the frequencies depicted in FIG. 2A illustrate how often a user accessed different applications (e.g., applications 202, 204, and 206) over a period time. For example, the frequencies depicted in FIG. 2A can be measured over the course of several days, weeks, months, or other suitable amount of time, in order to accurately gauge how often the user expressed an interest in accessing the different applications. Additionally, it is noted that non-user initiated actions can also influence the manner in which the priority rankings are assigned within the computing device 102. For example, background processes, system kernels, etc., can be assigned priority rankings in accordance with their overall importance to the operation of the computing device 102.

In this fashion, the stored historical user activity data 200 depicted in FIG. 2A can be used to determine application priority rankings in a manner that focuses on user-initiated activity that is free from the influence of other non-user initiated activities, such as background system/application tasks (e.g., automated system/application upgrade activities that are not initiated by the user). It should be noted that the user activity level (UAL) depicted in FIG. 2A can represent a measurement of frequency of user-initiated operations. According to some embodiments, the frequencies depicted in FIG. 2A can represent how often a particular user-initiated operation was performed for applications 202, 204, and 206. For instance, according to some embodiments, the frequencies depicted in FIG. 2A can represent how often a user-initiated download (e.g., user initiating a download of desirable podcast or television show) was performed individually performed in association with applications 202, 204, and 206. Additionally, the frequencies depicted in FIG. 2A can also include how often an application was launched, how often an application was an active/front-facing application, and so on.

For example, the stored historical user activity data 200 can be gathered by the user activity detector 110 over a pre-determined period of time (e.g., days, weeks, months, etc.) and target associated levels of user activity for applications 202, 204, and 206. The stored historical user activity data 200 can then be analyzed by the learning engine 112 to detect any instances of user activity patterns. For example, as depicted by the graphical illustration in FIG. 2A, the learning engine 112 can determine that a user accessed the application 206 at an increased frequency over time in comparison to the applications 202 and 204. In turn, the memory allocation controller 118 can assign an application priority ranking to the application 206 that is higher than the application priority rankings assigned to the applications 202 and 204.

Additionally, the memory allocation controller 118 can also determine that the application 202 was utilized with greater frequency relative to the application 204, but with less frequency relative to the application 206. In turn, the memory allocation controller 118 can assign an application priority ranking to the application 202 that is less than the application priority ranking assigned to the application 206, but higher than the application priority ranking assigned to the application 204. Furthermore, the memory allocation controller 118 can determine that the application 204 was the least-utilized application in comparison to the applications 202 and 206. In turn, the memory allocation controller 118 can assign an application priority ranking to the application 204 that is lower than the application priority rankings assigned to the applications 202 and 206. In this fashion, the memory allocation controller 118 can use the stored historical user activity data 200 to (1) accurately determine how frequently a user accesses/utilizes a particular application, and (2) assign an appropriate priority ranking to the particular application. In this manner, the memory allocation controller 118 can utilize the priority rankings to beneficially prioritize applications when performing the various procedures described herein.

FIG. 2B illustrates how components of the computing device 102 can utilize the priority ranking data to perform their respective functions, according to some embodiments. As depicted by the application priority ranking procedures 208 represented in FIG. 2B, the memory allocation controller 118 can implement a data structure (e.g., data structure 212) to store data that includes the different application priority rankings determined by learning engine 112. In this fashion, the data structure 212 can correlate applications (e.g., the applications 202, 204, 206) to their respective assigned application priority rankings (e.g., the assigned application priority ranks 2, 3, and 1, respectively). Additionally, the cache data deletion engine 114/free memory allocator 116 can readily access the application priority rankings using the data structure 212 to initiate the performance of cache data deletion procedures/memory reservation procedures in accordance with the various techniques described herein.

Figure 3A:
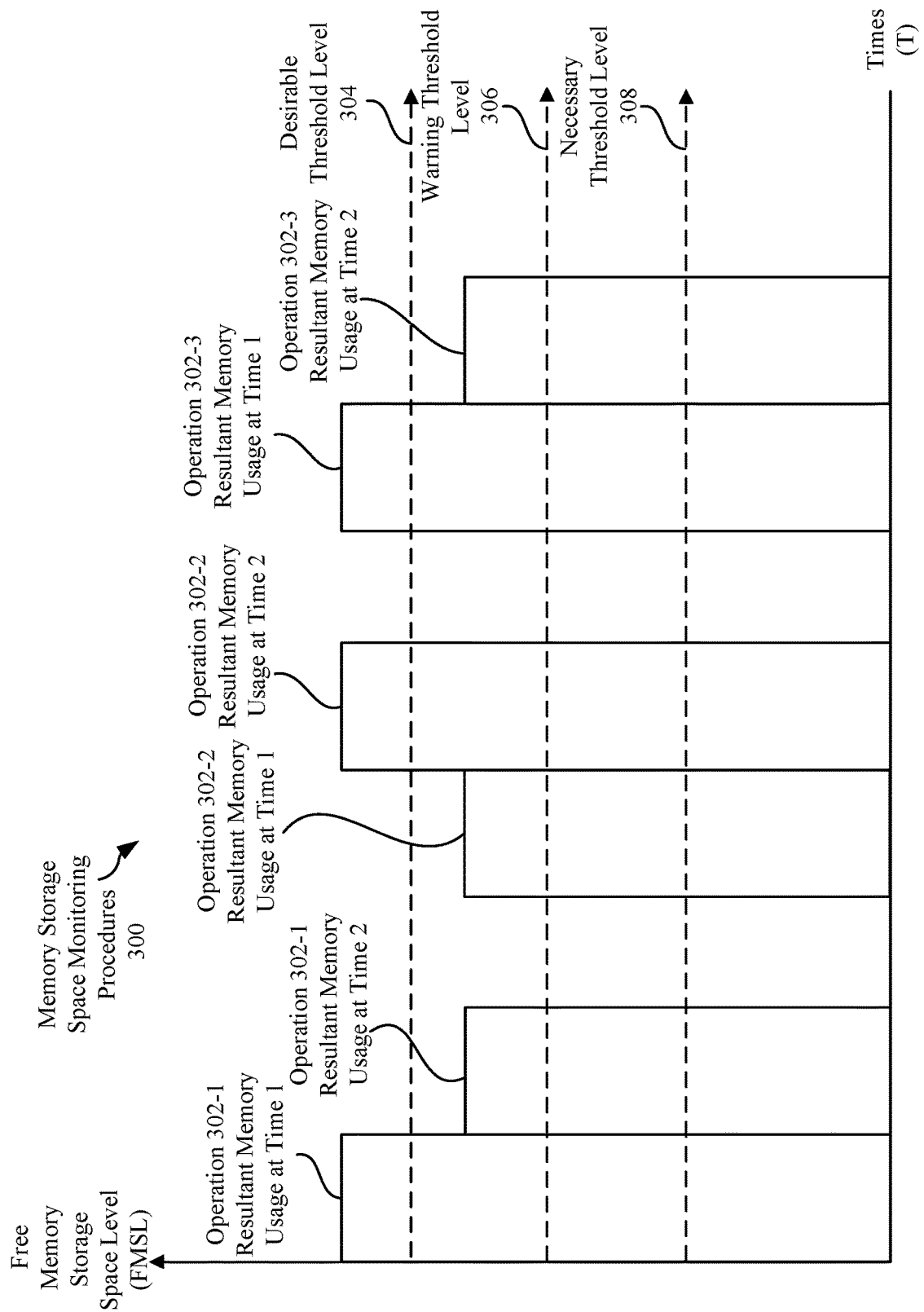
FIGS. 3A-3D illustrate exemplary procedures for managing the allocation of storage space within a storage device upon detection of fluctuating memory storage conditions, according to some embodiments.

FIGS. 3A-3D illustrate exemplary procedures for managing the allocation of storage space within a storage device upon detection of fluctuating memory storage conditions, according to some embodiments. In particular, FIG. 3A illustrates exemplary memory storage space monitoring procedures 300 performed by the memory allocation controller 118, according to some embodiments. In particular, FIG. 3A depicts different levels of resultant memory usage for three different operations (e.g., operations 302-1, 302-2, and 302-3) that execute in association with the applications 202, 204, and 206, respectively. As shown in FIG. 3A, the operations 302-1, 302-2, and 302-3 concurrently (or semi-concurrently) execute between times one (1) and two (2) on the computing device 102. The operations 302-1, 302-2, and 302-3 can each be, for example, data download operations requested by applications 202, 204, and 206, respectively. As shown in FIG. 3A, the operations 302-1, 302-2, and 302-3 each consume a specific amount of memory storage space from a total amount of free memory storage space available within the non-volatile memory 120 to effectively perform their respective operations.

In response, the memory allocation controller 118 can be configured to reference the amount of memory storage space that is currently being utilized (i.e., not available) within the non-volatile memory 120. For instance, as depicted in FIG. 3A, the memory allocation controller 118 can be configured to detect several different pre-defined memory storage space threshold levels (e.g., desirable threshold level 304, warning threshold level 306, and necessary threshold level 308) within the non-volatile memory 120. The memory storage space capacities represented by the desirable threshold level 304, the warning threshold level 306, and/or the necessary threshold level 308 can be represented in terms of different byte units such as terabytes, gigabytes, megabytes, and so on.

Notably, the desirable threshold level 304 can represent a first threshold level in which a large portion of the memory storage space within the non-volatile memory 120 is utilized (e.g., to store cache data), while additional memory storage space remains available if needed. For example, approaching or satisfying the threshold level 304 can represent a scenario in which substantial amounts of data associated with various applications is cached within the non-volatile memory 120, thereby enabling the various applications to readily-access their data and provide a pleasant user experience. At the same time, the additional memory storage space can enable the applications to readily perform additional/unexpected operations that do not require memory storage space to be freed, e.g., downloading a podcast or a television show before a flight.

Additionally, the warning threshold level 306 can represent a threshold level in which the amount of available memory storage space within the non-volatile memory 120 is approaching a low level, and the functionality of the applications can potentially be compromised. For example, when the warning threshold level 306 is met or the storage level goes beneath level 306, an operation requested by an application can potentially be carried out in an unexpected manner. For example, the operation can be delayed as the memory allocation controller 118 may be required to free up memory storage space to effectively carry out the operation.

Additionally, the necessary threshold level 308 can represent a threshold level in which the amount of available memory storage space within the non-volatile memory 120 is at a compromisingly low level. For example, when the necessary threshold level 308 is met or exceeded, an operation requested by an application likely will be carried out in an unexpected matter, e.g., the operation will fail due to insufficient available memory storage space.

It is noted that the various threshold levels described herein can be tuned in accordance with any aspects of the computing device 102, the hardware/software components included therein, and so forth, to establish threshold levels that maximize the operating performance of the computing device 102. By recognizing the various threshold levels described herein, the memory allocation controller 118 can be configured to determine when memory storage space fluctuations around the threshold levels indicate an imminent occurrence of a memory storage thrashing scenario. In response to these circumstances, the memory allocation controller 118 can take preventative measures that minimize the likelihood that a memory storage thrashing scenario will take place.

For instance, with further reference to FIG. 3A, the amount of free memory storage space available in the non-volatile memory 120 can fluctuate between the different threshold levels during different time periods, such as the period between times one (1) and two (2). The fluctuation in the amount of memory storage space can depend on the number of requests issued by the applications 202, 204, and/or 206, and the amount of time required for the computing device 102 to process each respective request.

For example, at time one (1), the memory allocation controller 118 can determine that the resultant memory usage of operations 302-1 and 302-3 (issued by the applications 202 and 206, respectively) each consume available memory in a manner that causes the computing device 102 to remain operating at or above the desirable threshold level 304. Additionally, the memory allocation controller 118 can determine that the resultant memory usage of operation 302-2 (associated with the application 204) consumes available memory in a manner that causes the computing device 102 to operate below the desirable threshold level 304 and above the warning threshold level 306.

In a similar manner, at time two (2), the memory allocation controller 118 can also determine that the operation 302-2 consumes free available memory in a manner that causes computing device 102 to operate at or above the desirable threshold level 304. Additionally, at time two (2), the memory allocation controller 118 can determine that operations 302-1 and 302-3 each consume available memory in a manner causes the computing device 102 to operate below the desirable threshold level 304 and above the warning threshold level 306.

Accordingly, the memory allocation controller 118 can detect these fluctuating memory storage space conditions caused by applications 202, 204 and 206 competing for memory storage space that is freed upon a completed requested operation between times one (1) and two (2). In response, the memory allocation controller 118 can correspondingly perform storage space allocation procedures that can allow these applications to operate at or above the desirable threshold level 304 in a more consistent manner. Moreover, by recognizing these fluctuating memory storage space conditions, the memory allocation controller 118 can perform procedures that allow the applications 202, 204, and/or 206 to utilize different amounts of free memory storage space as it becomes available in a manner that is more desirable to the user by taking into consideration application priority rankings assigned to each application.

Figure 3B:
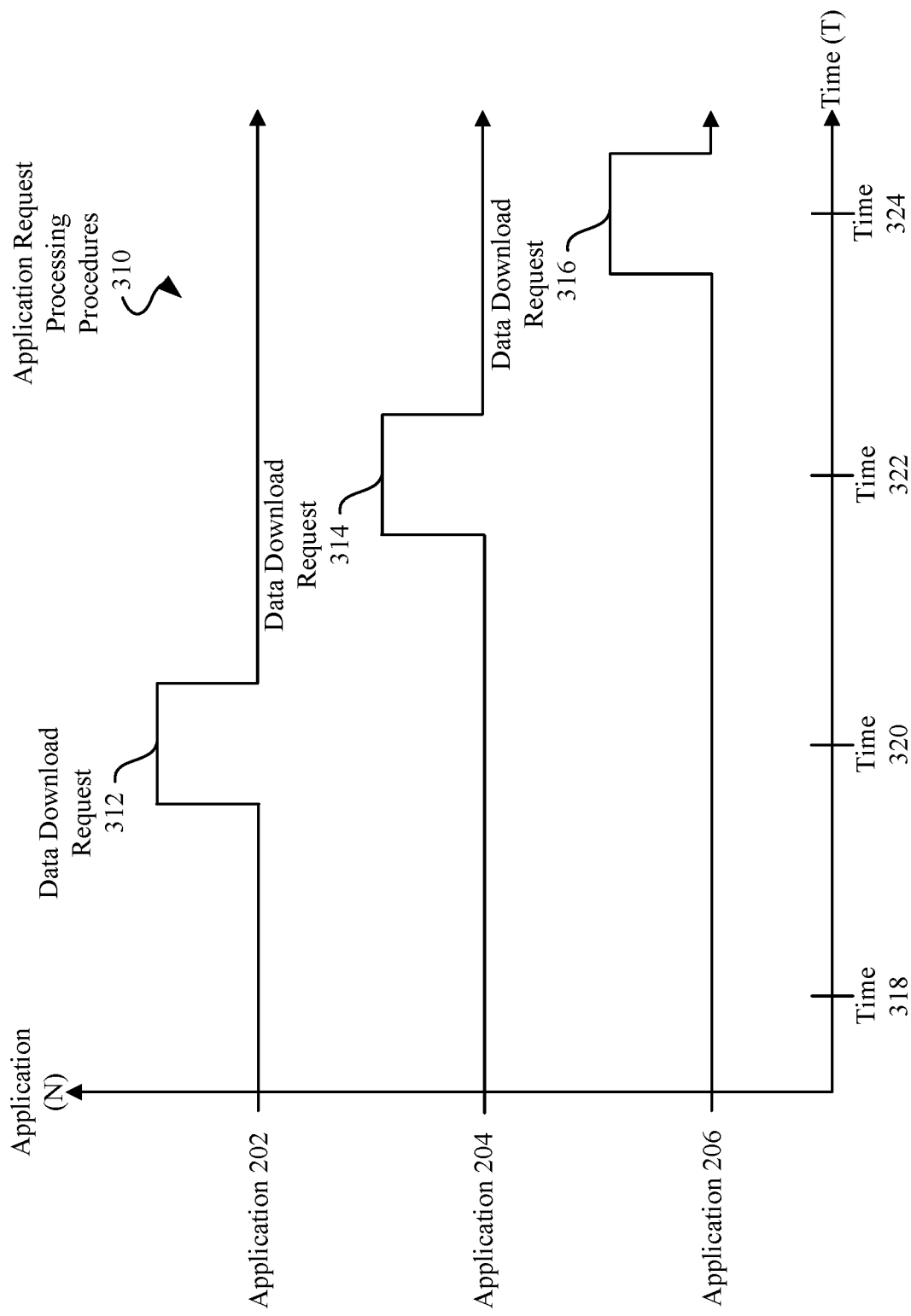

FIG. 3B illustrates exemplary procedures (e.g., application request processing procedures 310) for adjusting requested operations received from different applications in response to detecting fluctuating memory storage space conditions, according to some embodiments. In particular, in FIG. 3B, the memory allocation controller 118 can adjust the manner in which data operation requests issued by applications are processed upon detecting fluctuating memory storage space conditions that occur between times 318-324 in FIG. 3B. As illustrated in FIG. 3B, between the times 318-324, the applications 202, 204, and 206 can each issue respective data download requests (e.g., data download requests 312, 314, 316, respectively) to cause the computing device 102 to perform at least one data download operation. According to some embodiments, the data download requests 312, 314, and/or 316 can each specify a respective amount of memory storage space to be reserved within the non-volatile memory 120 to enable the data download request to be properly performed.

According to some embodiments, the data download requests 312, 314, and 316 can be marked as speculative download data requests. In particular, speculative download data requests can refer to requests that are initiated by the applications themselves (e.g., background requests), which contrast the requests that are initiated by users. For instance, the data download requests 312, 314, and/or 316 can be generated by their respective applications based on speculations that a user may be interested in particular download that has just been made available (e.g., a video posted by a friend on a social network). According to some embodiments, the rationale for issuing speculative data download requests 312, 314, and/or 316 can be based on user preference data (e.g., the stored historical user activity data 200) that supports a decision by an application to pre-emptively issue the data download request rather than wait for the user to initiate the request. For example, the application can be configured to automatically/immediately download new television shows as they become available.

With further reference to FIG. 3B, the data download requests issued by the applications 202, 204, and 206 can be generated at different times during the fluctuating memory storage space conditions that occur between times 318-324. For instance, the data download request 312 can be issued by the application 202 at time 320. Additionally, the data download request 314 can be issued by the application 204 at time 322. Furthermore, the download request 316 can be issued by the application 206 at time 324. Notably, although the application 202 issued the data download request 312 before the applications 204 and 206 issued their respective data download requests, the memory allocation controller 118 can adjust the manner in which the download requests 312, 314, and/or 316 are processed based on the application priority rankings assigned to the applications. Thus, with reference to the application priority ranking procedures performed in FIG. 2B (e.g., the application priority ranking procedures 208)—in which the application 206 was assigned a higher priority ranking relative to the applications 202 and 204—the memory allocation controller 118 can cause operations associated with the data download request 316 to be performed before processing the data download requests 312 and 314 (issued by the applications 202 and 204, respectively).

Notably, in some scenarios, an application may attempt to send multiple data download requests after an initial data download request is not immediately processed by the computing device 102. In such scenarios, according to some embodiments, the memory allocation controller 118 performs procedures that can throttle the manner in which these subsequent data download requests are issued by the application. In this fashion, the described embodiments perform procedures that can prevent the application from unnecessarily issuing requests that would otherwise result in wasted computational resources on the computing device 102.

For instance, in one scenario, the memory allocation controller 118 can communicate signals to an application (e.g., the application 204) that cause the issuance of any subsequent data download requests from the application to be delayed for a specific period of time after the issuance of an initial data download request (e.g., the data download request 314). In another scenario, the memory allocation controller 118 can slow down the timing of a subsequent data download request issued by the application by temporarily refusing to receive communications sent from the application. For example, according to some embodiments, the memory allocation controller 118 can include the functionality to adjust port settings that facilitate the communications between the memory allocation controller 118 and the application (e.g., the application 204). In particular, the port settings can be adjusted such that the memory allocation controller 118 can ignore communications received from the application for a specific period of time. Upon determining an appropriate time to re-engage communications with the application, the memory allocation controller 118 can (again) adjust the port settings in order to listen for any subsequent data download requests issued by the application.

Accordingly, the above-described throttling procedures can enable the memory allocation controller 118 to have sufficient time to perform the described storage space creation procedures in order to efficiently free-up storage space with little to no interruption from applications that are improperly issuing requests. Additionally, and as will be described in greater detail herein, the memory allocation controller 118 can delay the execution of requests issued by lower-priority applications based on pre-established scenarios associated with the operational conditions of the computing device 102.

Figure 3C:

FIG. 3C illustrates exemplary cache data deletion procedures (e.g., cache data deletion procedures 326) that are performed based on determined application priority rankings, according to some embodiments. As previously described herein, the cache data deletion engine 114 can initiate operations that result in the deletion of cache data based at least in part on application priority rankings. In this fashion, operations issued by applications having lower priority rankings can be deprioritized in order to process operations issued by applications having higher priority rankings. In this manner, the free memory allocator 116 can reserve at least a portion of the memory storage space that is freed (i.e., subsequent to the performance of the cache data deletion operations) so that the computing device 102 can effectively perform the data operation for the higher priority application.

As depicted by the embodiment represented in FIG. 3C, the memory allocation controller 118 can use a data structure (e.g., the data structure 328) to store data that can be used to track the performance of the cache data deletion procedures 326. For example, the data structure 328 can store application priority ranking data that includes different application priority ranks that are determined by the memory allocation controller 118 (e.g., application priority ranks two (2) and three (3) that are assigned to the applications 202 and 204, respectively). Based on this application priority ranking data, the memory allocation controller 118 can instruct the cache data deletion engine 114 to specifically target the application 204, first, as a candidate to delete cache data associated with one or more files, followed by the application 202. In turn, the cache data deletion engine 114 can issue (1) a first request, to the application 204, to delete one or more files and (2) a second request, to the application 202, to delete one or more files. According to some embodiments, the application 206 can be selected as a last-resort candidate for cache data deletion operations given the preference of the user toward the application 206 over the applications 202 and 204. In this fashion, the memory allocation controller 118 can resort to instructing the cache data deletion engine 114 to select the application 206 as a candidate for cache data deletion operations under circumstances in which the deletion of cache data related to the applications 202 and 204 is unable to yield sufficient free memory storage space to carry out an important operation (e.g., a user-initiated request). It is understood that embodiments of the present invention can be configured to utilize any cache data deletion policy and are not strictly limited to those described herein.

As previously described herein, the cache data associated with a particular file may be assigned a particular priority level by a specific application based on a cache data priority policy implemented by the application. In some scenarios, different applications can each employ an age-based policy in which the cache data that is not normally reused by a particular application can be assigned a low priority, while the cache data that is frequently reused by the application can be assigned a high priority. According to some embodiments, the priority levels assigned to the cache data can be determined based on conditions that include, but are not limited to, application last access times, application last used times, last data purge times, and so on.

With further reference to the embodiment depicted in FIG. 3C, based on cache data priority policies implemented by the applications 202 and 204, the cache data associated with the files 330-1, 330-2, 330-3, 332-1, 332-2, and 332-3 are each designated by their respective applications as "low priority." Accordingly, as illustrated in FIG. 3C, the cache data associated with the files 330-1, 330-2, 330-3, 332-1, 332-2, and 332-3 are initially selected by the applications 202 and 204 as candidates for deletion upon receipt of their respective delete file requests issued by the cache data deletion engine 114.

It should be noted that, in scenarios in which the cache data deletion engine 114 is configured to invoke a service capable of deleting one or more files (i.e., in lieu of requesting the applications themselves to delete files), the procedures described in FIG. 3C can still be performed. Notably, in such scenarios, cache data memory locations can be identified using data stored in the data structure 328. Although not depicted in FIG. 3C, additional data related to the application 206 can also be included in the data structure 328 and used for cache data deletion operations consistent with the procedures described herein.

With further reference to the embodiment depicted in FIG. 3C, the memory allocation controller 118 can also use the data structure 328 to determine whether one or more applications have complied with a delete file request. For instance, upon receipt of the first delete file request, the application 204 can initiate file deletion procedures that result in the cache data, associated with the files 332-1 and 332-3, to be deleted. Also, upon receipt of the second delete file request, the application 202 can initiate file deletion procedures that result in the cache data, associated with the files 330-1 and 330-3, to also be deleted. Notably, as illustrated in FIG. 3C, the deletion of both files 330-2 and 332-2, associated with the applications 202 and 204, respectively, are currently "pending." As previously described herein, the described embodiments can issue requests for applications to delete one or more files without waiting for each request to be fulfilled by each respective application. Thus, despite both the fact that both the applications 202 and 204 have not fully completed their respective file deletion procedures, the memory allocation controller 118 can nevertheless continue to instruct the cache data deletion engine 114 to send delete file requests to other applications without waiting for the applications 202 and 204 to finish their respective deletion procedures. In this fashion, the memory allocation controller enables the computing device 102 to obtain a desired amount of memory storage much more quickly and efficiently.

It should be noted that, in some scenarios, the memory allocation controller 118 can use the data structure 328 to identify one or more applications that frequently comply with a request, issued by the cache data deletion engine 114, to delete one or more files. For instance, in some scenarios, the applications 202 and 204 can be frequently targeted by the cache data deletion engine 114 to delete their respective files given their detected tendencies to frequently comply with file deletion requests issued by the cache data deletion engine 114. By targeting the applications 202 and 204 in this manner, the memory allocation controller 118 can help the computing device 102 quickly obtain the desired freed up memory storage space.

Upon completion of the cache data deletion procedures 326 described in FIG. 3C, a minimum amount of free memory storage space can be made available for the computing device 102 to optimally execute operations corresponding to the data download request 316 issued by the application 206 at time 324 in FIG. 3B. For instance, the free memory allocator 116 can reserve at least a portion of the memory storage space made available as a result of the cache data deletion procedures 326, and subsequently execute the operations corresponding to the data download request 316. According to some embodiments, a minimum amount of free memory storage space can be indicated by the data download request 316. Accordingly, the procedures initiated by the cache data deletion engine 114 can result in the performance of cache data delete operations that produce the requisite amount of free memory storage space specified by the data download request 316.

Furthermore, according to some embodiments, the memory allocation controller 118 can schedule the execution of requests issued by lower priority applications based on pre-determined scenarios associated with the operational conditions of the computing device 102. For example, the memory allocation controller 118 can schedule the execution of requests issued by lower priority ranked applications (e.g., the applications 202, 204) to coincide with an availability of power and/or a bandwidth of an available network connection coupled to the computing device 102. According to some embodiments, the memory allocation controller 118 can schedule the execution of requests issued by lower priority applications to coincide with pre-determined time periods, such as a time when the memory allocation controller 118 anticipates that the computing device 102 will not be utilized by a user (e.g., time periods in which the user is likely asleep). In this fashion, the memory allocation controller 118 can effectively minimize the occurrence of fluctuating memory storage space conditions caused by the applications 202, 204, and 206 by scheduling the execution of requests issued by lower priority applications based on the recognized operational conditions computing device 102.

Figure 3D:
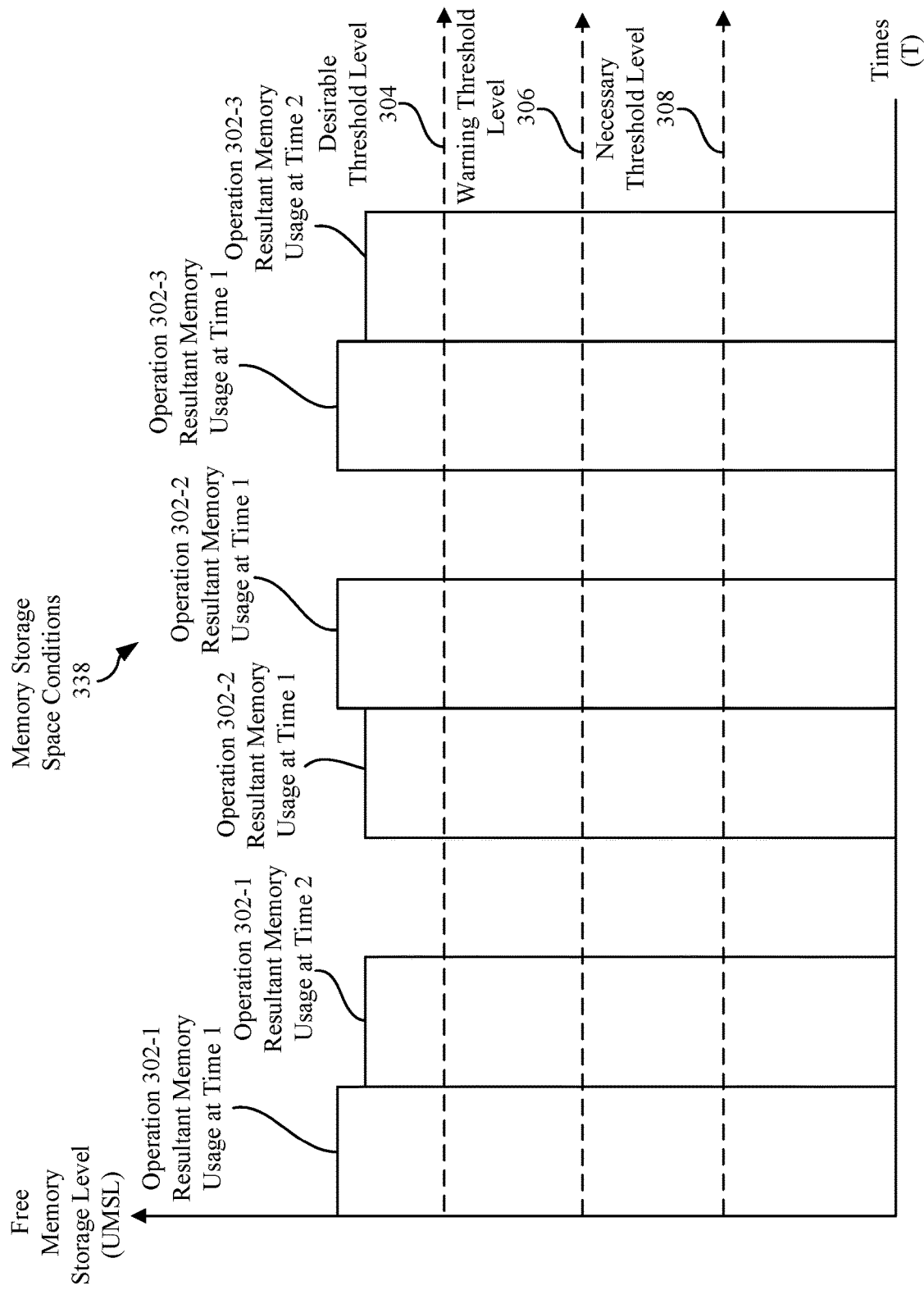

FIG. 3D illustrates memory storage space conditions 338 after performing cache data deletion procedures (and prudently reserving the allocated free space produced therefrom), according to some embodiments. As illustrated in FIG. 3D, several operations (e.g., operations 302-1, 302-2, and 302-3) can execute and consume memory storage space in a manner that allows the computing device 102 to remain operating within the desirable threshold level 304. As described herein, by enabling the computing device 102 to execute at or above the desirable threshold level 304, a more satisfactory user experience can be provided (e.g., as the applications can cache large amounts of data for immediate access without compromising the available storage space in the computing device 102). In this fashion, computing device 102 can also effectively minimize the occurrence of fluctuating memory storage conditions caused by applications 202, 204 and 206 prior to the performance of the cache data deletion procedures and memory reservation operations performed by computing device 102.

Figure 4A:
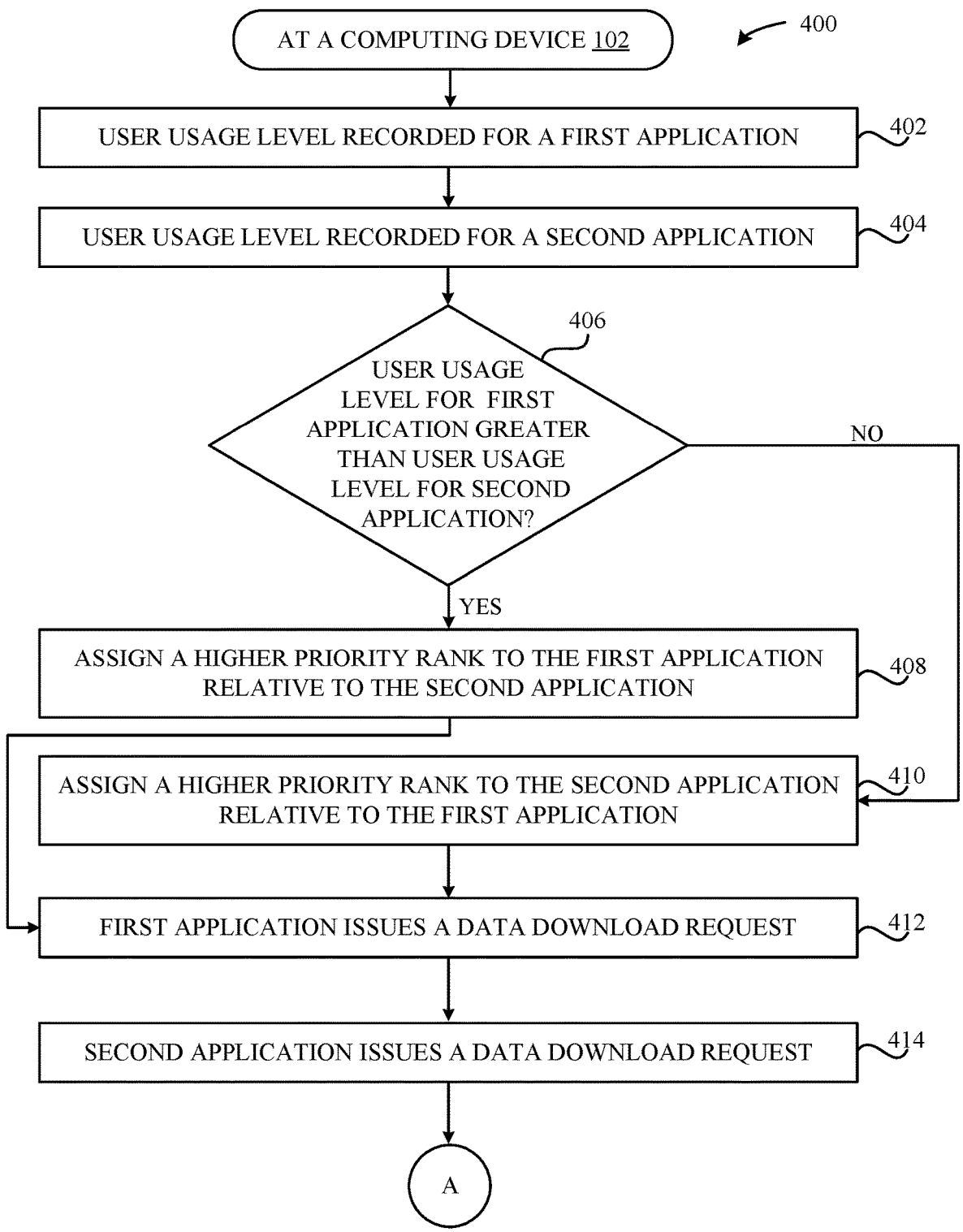
FIGS. 4A-4C illustrates a method for managing the allocation of storage space within a storage device, according to some embodiments.

FIG. 4A illustrates a method 400 for managing the allocation of storage space within a storage device, according to some embodiments. As shown in FIG. 4A, the method 400 can be implemented at the computing device 102, and begins at step 402, where a user activity level is recorded for a first application by the computing device 102. Types of user activity recorded by the computing device 102 can include, for example, past data download activities initiated by a user of the computing device 102. Next, at step 404, a user activity level is recorded for a second application by the computing device 102.

At step 406, the computing device 102 determines whether the user activity level (see, e.g., FIG. 2A) of the first application is greater than the user activity level of the second application. When the user activity level of the first application is greater, the computing device 102 assigns a higher priority rank to the first application relative to the second application, which is described below at step 408. Otherwise, the computing device 102 assigns a higher priority rank to the second application relative to the first application, which is described below at step 410.

At step 408, and in response to the computing device 102 determining that the user activity level for the first application is greater than the user activity level for the second application, the computing device 102 assigns a higher priority rank to the first application relative to the second application. The first application can then proceed to issue a first data download request, which is described below at step 412. At step 410, and in response to the computing device 102 determining that the user activity level for the first application is not greater than the user activity level for the second application, the computing device 102 assigns a higher priority rank to the second application relative to the first application. Next, at step 412, the first application issues a request to download data. Also, at step 414, the second application issues a request to download data. The manner in which these data download requests are handled can be based on the priority rankings assigned to the first and the second applications, which is described in greater detail below.

Figure 4B:
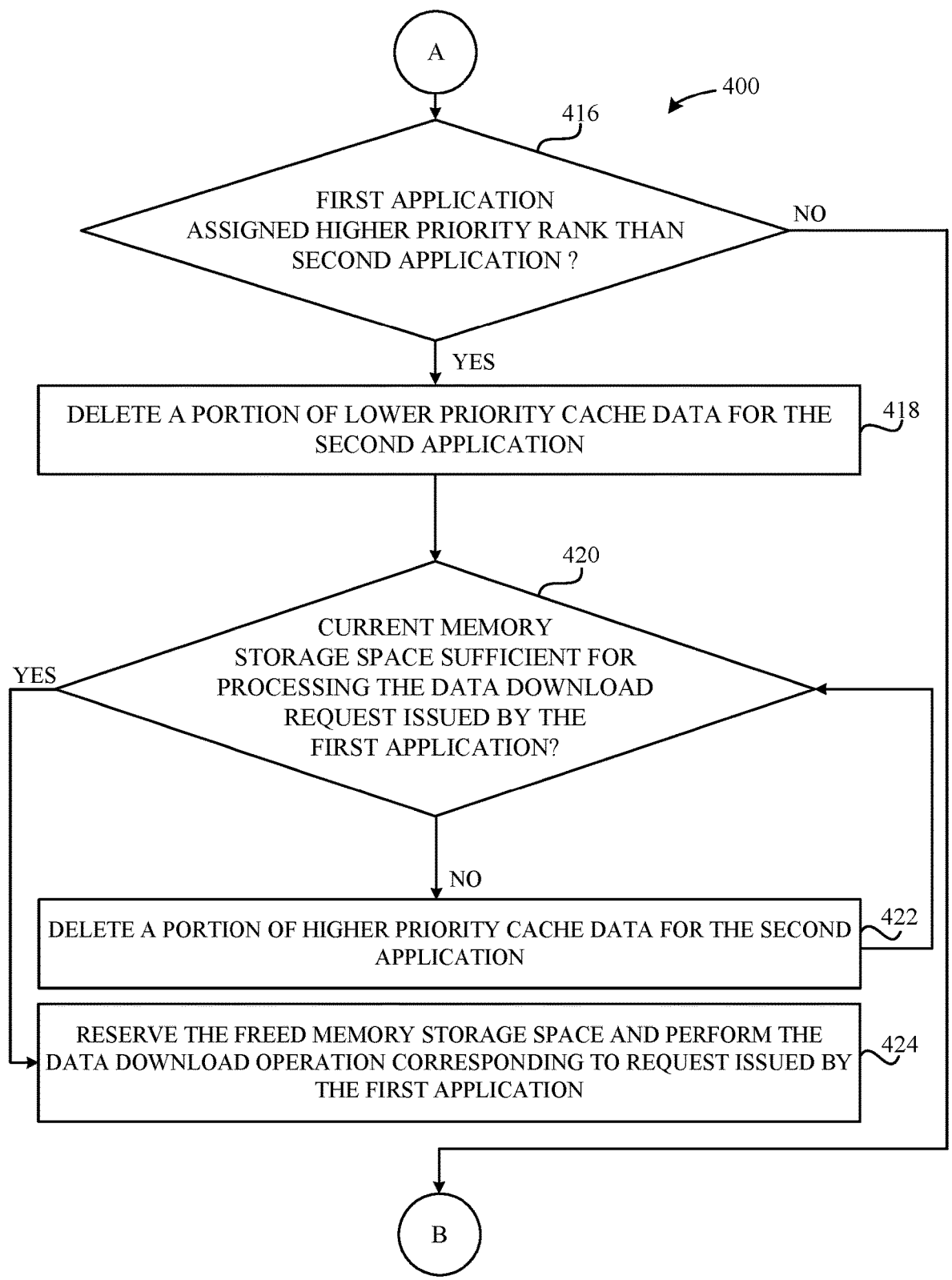

Next, at step 416 of FIG. 4B, upon receipt of the data download requests issued by the first and second applications at steps 412 and 414, respectively, the computing device 102 determines whether the first application is assigned a higher priority rank than the second application. If the first application was assigned a higher priority rank, then the computing device 102 can delete a portion of lower priority cache data for the second application, as described in step 418. Otherwise, the computing device 102 can delete a portion of lower priority cache data for the first application, as described in step 426 in FIG. 4C.

Next, at step 418, the computing device 102 determines that the first application is assigned a higher priority rank in comparison to the second application, and deletes a portion of lower priority cache data for the second application. For example, the computing device 102 can request only a small portion of the lower priority cache data to be deleted in attempt to restore the computing device to the desirable threshold level. Next, at step 420, the computing device 102 determines whether the current memory storage space is sufficient for processing the data download request issued by the first application. If the current memory storage space is sufficient, then the computing device 102 proceeds to reserve the freed memory storage space to perform the data download operation corresponding to the request issued by the first application, as described in step 424. Otherwise, the computing device 102 correspondingly deletes a portion of higher priority cache data for the second application, as described in step 422.

Next, at step 422, the computing device 102 determines that the current memory storage space is not sufficient, and correspondingly deletes a portion of higher priority cache data for the second application. Upon completion of the cache data deletion procedures, the computing device 102 determines whether the current memory storage space is sufficient for processing the data download request issued by the first application, as detailed in step 420. Next, at step 424, since the computing device 102 previously determined the current memory storage space is sufficient, and, therefore, (provided no user-initiated data download requests are detected) the computing device 102 can proceed to reserve the freed memory storage space to perform the data download operation corresponding to the request issued by the first application. Reserving the freed memory storage space in this manner allows the computing device 102 to execute and consume memory storage space to remain operating within a desirable threshold level (see, e.g., FIG. 3D).

Computing device 102 can optionally schedule the execution of the data download operation corresponding to the request issued by the second application to coincide with pre-determined operational conditions of computing device 102 such as an availability of power, a bandwidth of an available network connection coupled to computing device 102, and so on.

Figure 4C:
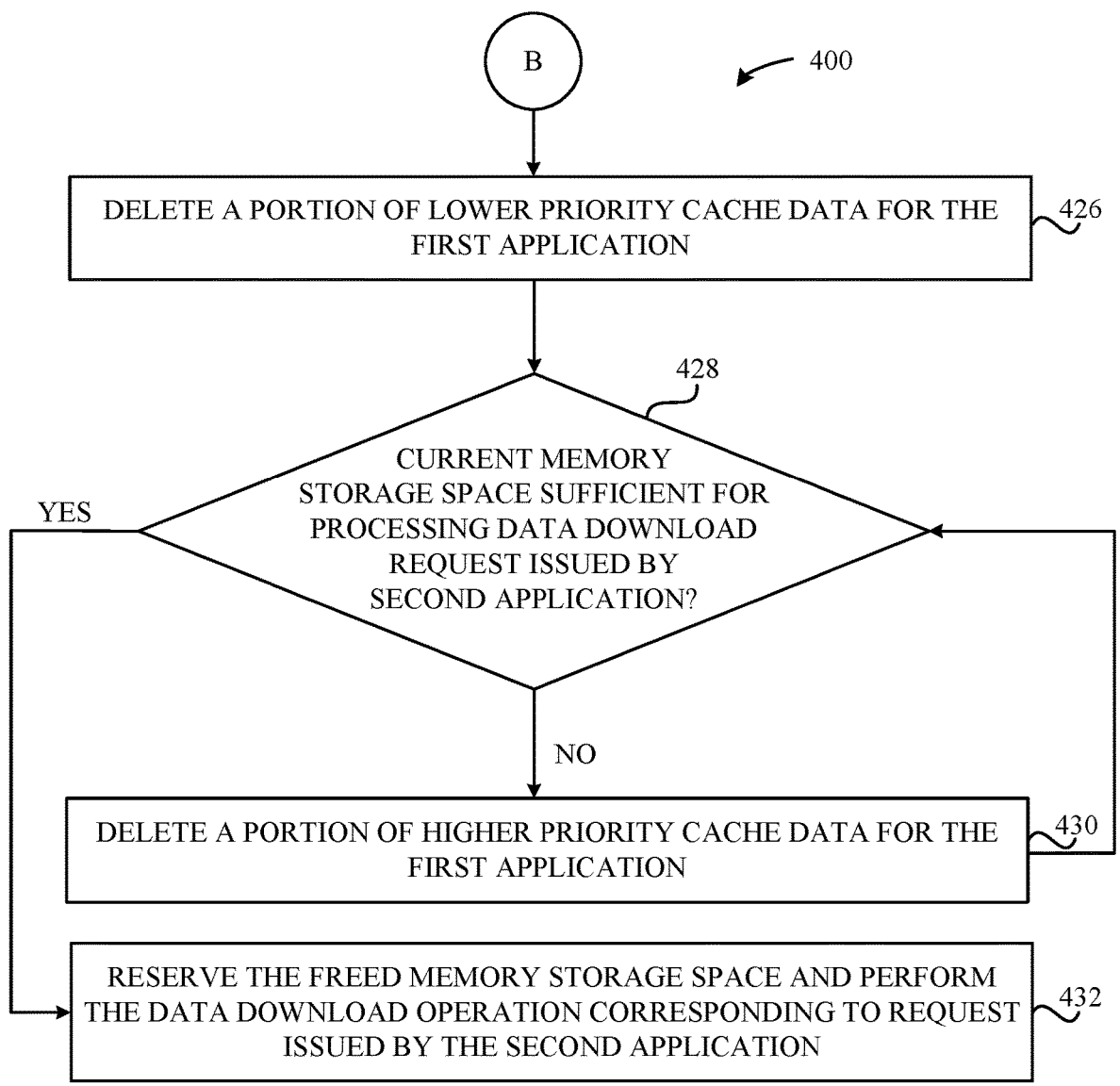

Next, at step 426 of FIG. 4C, the computing device 102 determines that the first application is not assigned a higher priority, and correspondingly deletes a portion of lower priority cache data for the first application. Again, the computing device 102 can request only a small portion of the lower priority cache data to be deleted in attempt to restore the computing device to the desirable threshold level. Next, at step 428, the computing device 102 determines whether the current memory storage space is sufficient for processing the data download request issued by the second application. If the current memory storage space is sufficient, then the computing device proceeds to reserve the freed memory storage space and to perform the data download operation corresponding to the request issued by the second application, as described in step 432. Otherwise, the computing device 102 correspondingly deletes a portion of higher priority cache data for the first application, as described in step 430.

Next, at step 430, the computing device 102 determines the current memory storage space is not sufficient, and correspondingly deletes a portion of higher priority cache data for the first application. Upon completion of the cache data deletion procedures, the computing device 102 determines whether the current memory storage space is sufficient for processing the data download request issued by the second application, as detailed in step 428. Next, at step 432, the computing device 102 determines the current memory storage space is sufficient, and, provided no user-initiated data download requests are detected, the computing device 102 proceeds to reserve the freed memory storage space to perform the data download operation corresponding to the request issued by the second application. Reserving the freed memory storage space in this manner allows the computing device 102 to execute and consume memory storage space to remain operating within a desirable threshold level (see, e.g., FIG. 3D).

Computing device 102 can optionally schedule the execution of the data download operation corresponding to the request issued by the first application to coincide with pre-determined operation conditions of computing device 102 such as an availability of power, a bandwidth of an available network connection coupled to computing device 102, and so on.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of the computing device 500.

The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also include the storage device 540, which can comprise a single disk or a collection of disks (e.g., hard drives), and includes a storage management module that manages one or more partitions within the storage device 540. In some embodiments, storage device 540 can include flash memory, semiconductor (solid state) memory, volatile memory (e.g., any variety of RAM), non-volatile random access memory (RAM), or any combination thereof. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the computing device 102, including user activity detector 110, learning engine 112, cache data deletion engine 114, free memory allocator 116, memory allocation controller 118, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing available storage space within a storage device, the method comprising, at a computing device that is communicably coupled to the storage device:

receiving a request from an application executing on the computing device, wherein the request specifies an amount of space to be allocated within the storage device;

allocating the amount of space within the storage device in response to the request; and in response to determining that an amount of free space in the storage satisfies a threshold:

identifying two or more applications on the computing device, wherein the two or more applications are associated with a prioritization and do not include the application, issuing, to each application of the two or more applications, a respective command to delete a respective amount of data associated with the application, receiving, from each application of the of two or more applications, a respective response that indicates whether the application deleted the respective amount of data in accordance with the respective command, and updating the prioritization based on the respective responses received from the two or more applications.

2. The method of claim 1, further comprising, prior to allocating the amount of space within the storage device;

determining that allocating the amount of space within the storage device will not cause the amount of free space to satisfy a second threshold.

3. The method of claim 2, wherein:

the threshold represents a first amount of available space within the storage device, the second threshold represents a second amount of available space within the storage device, and the first amount is greater than the second amount.

4. The method of claim 1, wherein the prioritization is based on monitoring user activity patterns associated with the applications.

5. The method of claim 1, wherein the respective commands issued to the two or more applications indicate different respective amounts of data to be deleted.

6. The method of claim 5, wherein the respective amounts of data are based on the prioritization.

7. The method of claim 1, wherein the respective commands issued to the two or more applications further indicate respective priority levels of data to be deleted by the respective applications.

8. A computing device configured to manage available storage space within a storage device, the computing device comprising:

the storage device;

at least one processor; and at least one memory configured to store instructions that, when executed by the at least one processor, cause the computing device to:

receive a request from an application executing on the computing device, wherein the request specifies an amount of space to be allocated within the storage device;

allocate the amount of space within the storage device in response to the request; and in response to determining that an amount of free space in the storage satisfies a threshold:

identify two or more applications on the computing device, wherein the two or more applications are associated with a prioritization and do not include the application, issue, to each application of the two or more applications, a respective command to delete a respective amount of data associated with the application, receive, from each application of the two or more applications, a respective response that indicates whether the application deleted the respective amount of data in accordance with the respective command, and update the prioritization based on the respective responses received from the two or more applications.

9. The computing device of claim 8, wherein the at least one processor further causes the computing device to, prior to allocating the amount of space within the storage device;

determine that allocating the amount of space within the storage device will not cause the amount of free space to satisfy a second threshold.

10. The computing device of claim 9, wherein:

the threshold represents a first amount of available space within the storage device, the second threshold represents a second amount of available space within the storage device, and the first amount is greater than the second amount.

11. The computing device of claim 8, wherein the prioritization is based on monitoring user activity patterns associated with the applications.

12. The computing device of claim 8, wherein the respective commands issued to the two or more applications indicate different respective amounts of data to be deleted.

13. The computing device of claim 12, wherein the respective amounts of data are the prioritization.

14. The computing device of claim 8, wherein the respective commands issued to the two or more applications further indicate respective priority levels of data to be deleted by the respective applications.

15. At least one non-transitory computer readable storage medium configured to store instructions that, in response to being executed by at least one processor included in a computing device, cause the computing device to manage available storage space within a storage device that is communicably coupled to the computing device, by carrying out steps that include:

receiving a request from an application executing on the computing device, wherein the request specifies an amount of space to be allocated within the storage device;

allocating the amount of space within the storage device in response to the request; and in response to determining that an amount of free space in the storage satisfies a threshold:

identifying two or more applications on the computing device, wherein the two or more applications are associated with a prioritization and do not include the application, issuing, to each application of the two or more applications, a respective command to delete a respective amount of data associated with the application, receiving, from each application of the two or more applications, a respective response that indicates whether the application deleted the respective amount of data in accordance with the respective command, and updating the prioritization based on the respective responses received from the two or more applications.

16. The at least one non-transitory computer readable storage medium of claim 15, wherein the steps further include, prior to allocating the amount of space within the storage device:
  determining that allocating the amount of space within the storage device will not cause the amount of free space to satisfy a second threshold.

17. The at least one non-transitory computer readable storage medium of claim 16, wherein:
  the threshold represents a first amount of available space within the storage device,
  the second threshold represents a second amount of available space within the storage device, and
  the first amount is greater than the second amount.

18. The at least one non-transitory computer readable storage medium of claim 17, wherein the prioritization is based on monitoring user activity patterns associated with the applications.

19. The at least one non-transitory computer readable storage medium of claim 17, wherein the respective commands issued to the two or more applications indicate different respective amounts of data to be deleted.

20. The at least one non-transitory computer readable storage medium of claim 19, wherein the respective amounts of data are based on the prioritization.

* * * * *

UNITED STATES PATENT AND TRADEMARK OFFICE
CERTIFICATE OF CORRECTION

PATENT NO. : 10,599,353 B2
APPLICATION NO. : 15/725175
DATED : March 24, 2020
INVENTOR(S) : Mark A. Pauley et al.

Page 1 of 1

It is certified that error appears in the above-identified patent and that said Letters Patent is hereby corrected as shown below:

In the Claims

In Claim 1, at Column 19, Line 16: "receiving, from each application of the of two or more" should read -- receiving, from each application of the two or more --.

In Claim 13, at Column 20, Line 33: "respective amounts of data are the prioritization." should read -- respective amounts of data are based on the prioritization. --.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*